UNITED STATES PATENT OFFICE.

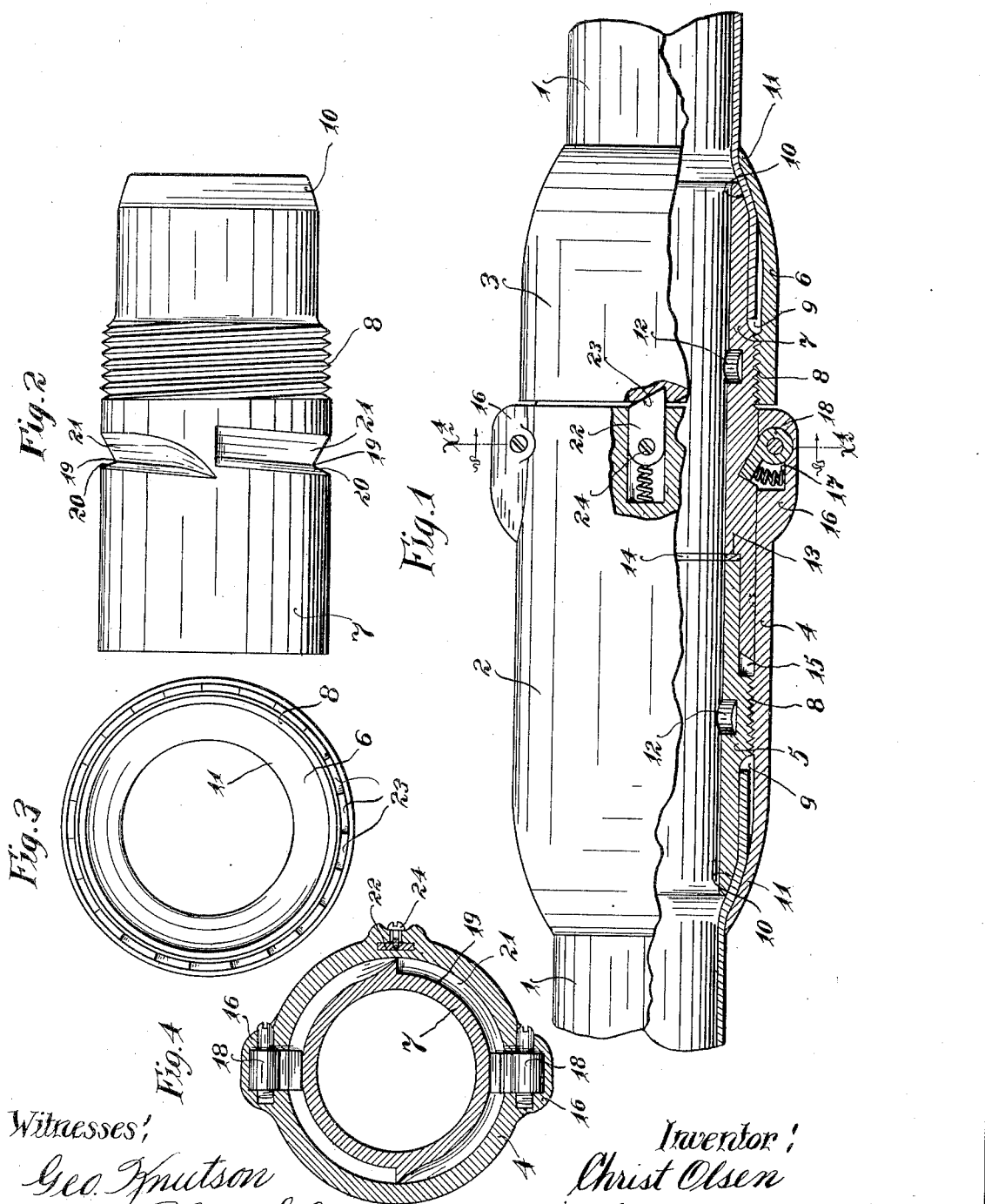

CHRIST OLSEN, OF PORT RICHMOND, NEW YORK.

HOSE-COUPLING.

1,098,752.     Specification of Letters Patent.     Patented June 2, 1914.

Application filed April 17, 1911. Serial No. 621,689.

*To all whom it may concern:*

Be it known that I, CHRIST OLSEN, a citizen of the United States, residing at Port Richmond, in the county of Richmond and State of New York, have invented certain new and useful Improvements in Hose-Couplers; and I do hereby declare the following to be a full, clear, and exact description of the invention, such as will enable others skilled in the art to which it appertains to make and use the same.

My invention has for its object to provide an improved coupler, especially adapted for use as a hose coupler, and, to this end, it consists of the novel devices and combinations of devices hereinafter described and defined in the claim.

The invention is illustrated in the accompanying drawings, wherein like characters indicate like parts throughout the several views.

Referring to the drawings, Figure 1 is a view of the improved coupler, partly in side elevation and partly in longitudinal section, with some parts broken away; Fig. 2 is a view in side elevation of one of the inner sleeves of one of the coupling heads; Fig. 3 is an inner end view of one of the outer sleeves of one of the coupling heads; and Fig. 4 is a transverse section taken on the irregular line $x^4$ $x^4$ of Fig. 1, with some parts broken away.

The numeral 1 indicates the inner ends of a pair of hose sections, which, as shown, are detachably connected by means of my improved coupler. This coupler is made up of a pair of separable and telescopically connected coupling heads 2 and 3, each of which comprises an inner sleeve and an outer sleeve. The outer and inner sleeves which go to make up the coupling head 2 are indicated by the numerals 4 and 5, respectively. The outer and inner sleeves which go to make up the coupling head 3 are indicated by the numerals 6 and 7, respectively. The sleeves of each coupling head are connected at their adjacent intermediate portions by means of screw threads 8 and which connections permit longitudinal adjustment of one of said sleeves with respect to the other. These sleeves are also circumferentially spaced apart, forward of their threaded engagement 8, to form annular seats 9 and into which seats the ends of the hose sections 1 are adapted to be inserted. Opposing hose clamping surfaces are formed on the ends of the sleeves of the clamping heads 2 and 3, at the entrance to the seats 9, for the purpose of securing the hose sections 1 to the coupling heads 2 and 3 and for forming a water-tight joint there-between.

The hose clamping surfaces on the inner sleeves 5 and 7 are indicated by the numerals 10 and are formed by beveling the outer faces of said sleeve outwardly and inwardly. The hose clamping surfaces on the outer sleeves 4 and 6 are indicated by the numerals 11 and are formed by curving the outer ends of the sleeve outwardly and inwardly in position to overlie the coöperating surfaces 10.

Each of the inner sleeves 5 and 7 is provided with a wrench seat 12, to which seats a wrench, not shown, may be applied for the purpose of rotating the inner sleeves with respect to the outer sleeves. As is evident, by reverse rotations of the inner sleeves with respect to the outer sleeves, the hose clamping surfaces 10 and 11 may be moved toward or from each other, at will, and a varying pressure may be applied to the interposed ends of the hose sections 1.

The sleeve 7, at its inner end, is internally reduced to form an annular shoulder 13, on which is seated a pliable packing 14. The ends of the sleeves 4 and 5, inward of their threaded engagement at 8, are concentrically spaced apart to afford a seat 15 which is adapted to telescopically receive the reduced end of the sleeve 7. Diametrically opposite bosses 16 are formed on the outer surface and, at the inner end portion of the sleeve 4. These bosses 16 are each provided with an internal seat 17 which is open on the inner side of the sleeve 4 and in which seat is pivotally mounted a spring-pressed lock dog 18. The lock dogs 18 normally project within the sleeve 4 and coöperate with a lock groove 19 formed in the sleeve 7 to hold the two coupling heads 2 and 3 interlocked. For action on each of the lock dogs 18, the lock groove 19 is provided with reversely acting cam surfaces 20 and 21. By reversely rotating the coupling heads 2 and 3 with respect to each other, and in a given direction, the cam surfaces 20 are forced onto the free ends of the lock dogs 19 and thereby draw the coupling heads 2 and 3 onto the pliable packing 14 to form a water-tight joint between the coupling heads 2 and 3. Then, by rotating the coupling heads in directions reverse to that just described, the lock dogs 18 will be brought into contact with the cam surfaces 21 and will thereby be cammed out of the lock groove 19 and into position to permit the endwise separation of the coupling heads 2 and 3. To adjustably hold the coupling heads 2 and 3, when connected, in set positions with respect to each other, a spring-pressed sliding pawl 22 is mounted for endwise sliding movement in a seat formed in the inner edge of the sleeve 4. The operative end of the pawl 22 normally projects through the said seat and in a position to engage a plurality of ratchet teeth 23 formed in the inner edge of the sleeve 6. The sliding pawl 22 is provided with a suitable operating finger pin 24 which works through a slot in the sleeve 4.

What I claim is:

A hose coupler made up of a pair of connected coupling heads, each comprising inner and outer sleeves connected by screw threads and having coöperating hose clamping surfaces which are made adjustable by the rotation of one of said sleeves with respect to the other, the inner end portion of the two sleeves of one of said heads being spaced apart and adapted to telescopically receive the inner end portion of the inner sleeve of the other of said heads, a pliable packing interposed between the said two inner sleeves, means for positively drawing said two inner sleeves onto said pliable packing under a varying pressure, and means for locking the coupling heads against accidental separation.

In testimony whereof I affix my signature in presence of two witnesses.

CHRIST OLSEN.

Witnesses:
 RUDOLPH MADSEN,
 JENS TERJESEN.

Copies of this patent may be obtained for five cents each, by addressing the "Commissioner of Patents, Washington, D. C."